350-6.7 SR

XR 3,701,999

United [15] 3,701,999

Congleto [45] Oct. 31, 1972

[54] COMPUTER OUTPUT LASER MICROFORM RECORDING SYSTEM

[72] Inventors: David B. Congleton, San Pedro; Donald L. Roberts, Cypress; Pat E. Evans, Torrance, all of Calif.

[73] Assignee: The National Cash Register Company, Dayton, Ohio

[22] Filed: Aug. 21, 1970

[21] Appl. No.: 65,790

[52] U.S. Cl. ........................346/76 L, 95/4.5, 350/6, 346/108

[51] Int. Cl. ..........................................G06k 15/02

[58] Field of Search ................346/76 L, 108; 95/4.5; 178/6.7 R, 6.7 A, 6.6 R; 350/7, 6

[56] References Cited

UNITED STATES PATENTS

| | | | |
|---|---|---|---|
| 2,453,905 | 11/1948 | Grib | 178/6.7 R |
| 3,181,170 | 4/1965 | Akin | 346/108 |
| 3,409,904 | 11/1968 | Maiershofer | 346/101 |
| 3,448,458 | 6/1969 | Carlson et al. | 346/76 L X |
| 3,465,352 | 9/1969 | Carlson et al. | 346/76 L |
| 3,573,847 | 4/1971 | Sacerdoti | 346/76 L |

*Primary Examiner*—Joseph W. Hartary
*Attorney*—Louis A. Kline and Joseph R. Dwyer

[57] ABSTRACT

A computer output laser microform recording system which includes a recirculating memory for storing binary coded characters originating in a computer and a character generator which translates the binary coded characters to shapes for recording. The laser microimage recorder employs a rotating polygon having a plurality of mirror faces for reflecting the laser beam as a continuous series of long horizontal scan lines. These scan lines are deflected vertically by a tilt mirror. An optical detector senses the start of the usable portion of each mirror face of the polygon to produce a horizontal sync pulse that is used to initiate circuits for controlling the transmission of binary coded characters from the recirculating memory to operate the character generator in synchronism with the moving recording laser beam. The binary coded characters are circulated in the recirculating memory once for each horizontal scan of the laser beam and made available to the character generator which successively provides a series of waveform patterns corresponding to a horizontal slice of each of the characters which is recorded during each of the horizontal scans by modulating the laser beam so as to effectively synthesize the characters in a row piecewise in a vertical direction.

20 Claims, 14 Drawing Figures

3701999
OR IN 346/76L

INVENTORS
DAVID B. CONGLETON
DONALD L. ROBERTS
PAT E. EVANS

BY Louis A Kline
Joseph R Dwyer
John T. Matlago
THEIR ATTORNEYS

INVENTORS
DAVID B. CONGLETON
DONALD L. ROBERTS
PAT E. EVANS

BY Louis A Kline
Joseph R. Dwyer
John T. Matlago
THEIR ATTORNEYS

| HORIZONTAL BIT COUNT | FLOP-FLOPS HB5 | HB4 | HB3 | HB2 | HB1 | |
|---|---|---|---|---|---|---|
| B1 | 0 | 0 | 0 | 0 | 0 | |
| B2 | 0 | 0 | 0 | 0 | 1 | HB1 HB2' |
| B3 | 0 | 0 | 0 | 1 | 1 | HB2 HB3' |
| B4 | 0 | 0 | 1 | 1 | 1 | HB3 HB4' |
| B5 | 0 | 1 | 1 | 1 | 1 | HB4 HB5' |
| B6 | 1 | 1 | 1 | 1 | 1 | HB5 HB1 |
| B7 | 1 | 1 | 1 | 1 | 0 | HB2 HB1' |
| B8 | 1 | 1 | 1 | 0 | 0 | HB3 HB2' |
| B9 | 1 | 1 | 0 | 0 | 0 | |

INVENTORS
DAVID B. CONGLETON
DONALD L. ROBERTS
PAT E. EVANS

BY Louis A. Kline
Joseph R. Dwyer
John J. Mathago
THEIR ATTORNEYS

INVENTORS
DAVID B. CONGLETON
DONALD L. ROBERTS
PAT E. EVANS
Louis A Kline
Joseph R Dwyer
BY John T. Matlago
THEIR ATTORNEYS

INVENTORS
DAVID B. CONGLETON
DONALD L. ROBERTS
PAT E. EVANS

BY Louis A Kline
Joseph R Dwyer
John T. Matlago
THEIR ATTORNEYS

FIG. 9

$$0 = \{P_1(S_1+S_9)+P_2(S_2+S_8)+P_3(S_3+S_4+S_5+S_6+S_7)\}\ (C0')'$$

$$1 = \{P_4(S_1+S_2+S_3+S_4+S_5+S_6+S_7+S_8+S_9)\}\ (C1')'$$

$$2 = \{P_1(S_6)+P_3(S_2)+P_5(S_1)+P_6(S_3+S_4)+P_7(S_8)+P_8(S_9)+P_{10}(S_5)+P_{13}(S_7)\}\ (C2')'$$

$$3 = \{P_1(S_5)+P_3(S_2+S_8)+P_5(S_1+S_9)+P_6(S_3+S_7)+P_{10}(S_4+S_6)\}\ (C3')'$$

$$4 = \{P_8(S_6)+P_{10}(S_7+S_8+S_9)+P_{15}(S_1+S_2+S_3+S_4+S_5)\}\ (C4')'$$

$$5 = \{P_3(S_8)+P_5(S_9)+P_6(S_6+S_7)+P_7(S_2+S_3+S_4)+P_8(S_1)+P_9(S_5)\}\ (C5')'$$

$$6 = \{P_1(S_1+S_9)+P_2(S_2+S_8)+P_3(S_6+S_7)+P_7(S_3+S_4)+P_9(S_5)\}\ (C6')'$$

$$7 = \{P_4(S_6)+P_6(S_2+S_3)+P_7(S_9)+P_8(S_1)+P_{10}(S_4)+P_{11}(S_5)+P_{12}(S_7)+P_{13}(S_8)\}(C7')$$

$$8 = \{P_1(S_1+S_5+S_9)+P_2(S_2+S_4+S_6+S_8)+P_3(S_3+S_7)\}\ (C8')'$$

$$9 = \{P_1(S_1+S_9)+P_2(S_2+S_8)+P_3(S_3+S_4)+P_{14}(S_5)+P_6(S_6+S_7)\}\ (C9')'$$

$$= \ = \{P_5(S_3+S_6)\}\ (C=')'$$

$$+ = \{P_4(S_2+S_3+S_5+S_6)+P_5(S_4)\}\ (C+')'$$

$$- = \{P_5(S_4)\}\ (C-')'$$

$$\$ = \{P_1(S_2+S_5+S_8)+P_2(S_3+S_7)+P_4(S_1+S_9)+P_{10}(S_6)+P_{13}(S_4)\}\ (C\$')'$$

$$P = \{P_3(S_2+S_3+S_4)+P_7(S_6+S_7+S_8+S_9)+P_9(S_1+S_5)\}\ (CP')'$$

$$S = \{P_1(S_5)+P_3(S_2+S_8)+P_5(S_1+S_9)+P_6(S_7)+P_7(S_3)+P_{10}(S_6)+P_{13}(S_4)\}\ (CS')'$$

INVENTORS
DAVID B. CONGLETON
DONALD L. ROBERTS
PAT E. EVANS

Louis A Kline
BY Joseph R Dwyer
John J. Matlago
THEIR ATTORNEYS

INVENTORS
DAVID B. CONGLETON
DONALD L. ROBERTS
PAT E. EVANS

BY Louis A Kline
Joseph Dwyer
John J. Matlago
THEIR ATTORNEYS

INVENTORS
DAVID B. CONSLETON
DONALD L. ROBERTS
PAT E. EVANS

BY Louis A Kline
Joseph R Dwyer
John T. Matlago
THEIR ATTORNEYS

INVENTORS
DAVID B. CONGLETON
DONALD L. ROBERTS
PAT E. EVANS

BY Louis A Kline
Joseph Dwyer
John T. Matlago
THEIR ATTORNEYS

COMPUTER OUTPUT LASER MICROFORM RECORDING SYSTEM

This invention relates to computer output microform printing systems and more particularly to a laser microform recording system which provides for the rapid optical recording of graphic symbols in microimage size on a recording medium in response to binary coded data as generated in an electronic digital computer.

The interfacing of electronic digital computers and microfilm equipment for converting the binary coded digital output for such high speed equipment directly to graphic symbols on microfilm is highly desirable since it makes it possible to transfer computer stored data onto film in page format in varying styles and sizes at rates that are considerably faster than that possible with impact printers which are commonly provided for such purposes. The fact that the binary coded language from the computer can be printed on a recording medium as a usable record of intelligible symbols in microimage size is of great advantage since it makes it possible to store the vast amounts of paper output generated by a computer in a relatively small area, and thus reduces storage space and handling requirements. An added benefit of such a tie-in of a computer with microfilm equipment is the marked decrease in the time required to retrieve the information once it has been printed out.

The microform printing system of the present invention utilizes heat mode recording. This method of recording can be described as a process by which the energy from a laser or other radiative type source is concentrated to a point where the temperature effects optically modify a thin film recording surface. Techniques for modifying a recording media with a laser beam are described in the commonly assigned U. S. Pat. No. 3,465,352 of Carlson et al., entitled "Information Processing Systems Using Lasers," filed May 11, 1966. The major advantages of this process for microimage recordings are the low cost of the recording media, the rapid access to the recording because of the non-necessity of film processing, a resolution exceeding 2,000 television scan lines per image page, and the lack of critical environmental conditions commonly required by recording media. It is thus seen that the use of heat mode recording for a computer output microform printing system has many advantages over existing cathode ray tube or other electron beam approaches to recording inasmuch as these known systems not only use costly recording film such as photographic film requiring rigid environmental controls, but also require that the film be processed before it is available for use.

Briefly, the computer output laser microform recording system of the present invention is comprised of a laser microimage recorder, a character generator along with associated electronic counting and control circuits, and a recirculating memory. The binary coded data originating in a computer which is to be printed out in graphical form on a frame of the recording medium is transferred to the recirculating memory which is capable of storing all the binary coded characters to be graphically recorded piecewise in the vertical direction on a single row of the recording medium. The laser microimage recorder includes an optical system using a rotating polygon having a plurality of mirrored faces and a tilt mirror. The successive mirror faces of the polygon provide for reflecting the laser beam as a continuous series of long horizontal scans. These scan lines are deflected vertically, progressing from the top to the bottom of the frame by the tilt mirror. A polygon mirror face edge detector senses the start of the movement of the laser beam as it is horizontally deflected by each mirrored face of the polygon to produce a horizontal scan sync pulse that is effectively used to synchronize the recording operation of the laser beam with the character generator to provide the desired recording. The polygon mirror face edge detector thus indicates the start of the usable portion of each mirror face of the polygon and effectively synchronizes the transmission of data from the recirculating memory to the character generator with the horizontal position of the moving recording beam. The binary coded characters are circulated in the recirculating memory once for each horizontal scan of the laser beam and made available to the character generator which successively provides a series of pattern waveforms corresponding to a horizontal slice of each of the characters which is recorded during each of the horizontal scans by modulating the laser beam so as to effectively synthesize the characters in a row piecewise in a vertical direction.

Accordingly, one of the objects of the present invention is to provide a new and improved high speed laser recording system for performing the operation of computer output to microform.

Another object of the present invention is to provide a novel laser recording system for forming alphanumeric characters in microimage size on a recording medium in response to binary coded data as generated by an electronic digital computer.

Another object of the invention is to provide a laser microform recording system for converting the binary coded language generally employed in a digital computer into a printed usable record of intelligible symbols such as the alphabetic, numeric, etc., characters represented by the code.

It is another object of the invention to provide simple, reliable circuit means for timing and directing electrical pattern waveforms in synchronization with successive horizontal scannings of a laser beam so as to be able to modulate the laser beam to record successive portions of graphic characters in the proper position of a row on a recording medium.

Still another object of the invention is to provide a circuit means for successively generating a series of pattern waveforms corresponding to a horizontal slice of an entire row of characters for modulating each of a plurality of horizontal scans of a laser beam in the proper sequence to form the desired graphic shapes of the characters in the row.

These and other objects, advantages and features of the present invention will be more completely described in conjunction with the accompanying drawings in which:

FIG. 9 shows the logical equations defining the logical networks of the character generator for supplying the pattern waveforms used to graphically record each of the characters;

In order to provide a clear understanding of the preferred embodiment of the present invention, the laser microform recorder shown in FIG. 1 will first be described in detail. Then in FIG. 3 an overall block diagram of a computer equipment tie-in arrangement and the other electronic circuits associated with the laser microform recorder will be presented which will point out the approach of the system for recording the computer output in graphical form on the recording medium. Finally, detailed descriptions of the electronic circuits will be provided to illustrate the logical circuitry provided for the computer output microform system.

Figures 1, 2:
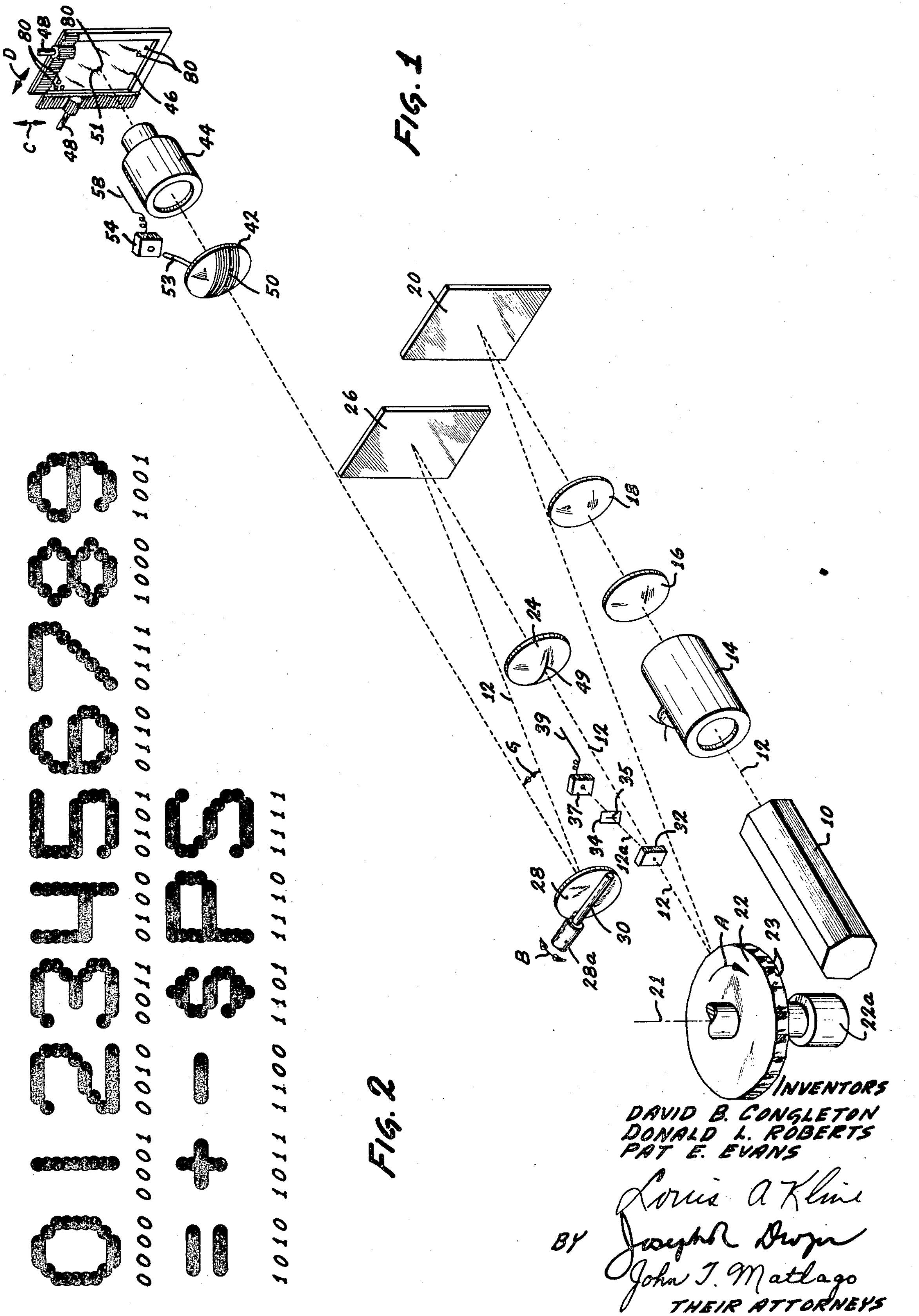
FIG. 1 is an overall view of the optical system for the laser microform recorder of the invention.
FIG. 2 illustrates the set of characters generated by the character generator for recording by the laser microform recorder.

Referring to FIG. 1 of the drawings, a conventional laser 10 is illustrated which may be typically a continuous-wave laser, oscillating in a single transverse mode. The beam emitted by the laser has a divergence that is preferably substantially diffraction limited so as to permit a Gaussian distribution of power through the cross-sectional area of the beam. An available laser of this type is a Model 125 helium-neon gas laser manufactured by Spectra-Physics, Inc. of Mountain View, California, having a power output of approximately 50–90 milliwatts, a wavelength of 6,328 Angstroms, and a beam divergence of approximately 0.7 milliradian.

The laser 10 in FIG. 1 emits a collimated linearly polarized output laser beam 12 of high brightness which passes to a modulator 14 such as the Spectra-Physics Model 320 Electrooptic Modulator with a Polarization Analyzer. The output laser beam intensity is modulated as it passes through modulator 14 from which it continues through a beam expanding lens 16 and a spot forming lens 18. The spot forming lens 18 focuses the beam after being reflected from a folding mirror 20 and one of the flat mirrored faces 23 of a rotating polygon 22 onto a field lens 24 where a horizontal scan line 49 is formed. An intervening beam splitter 32 forms a subsidiary laser beam 12a containing typically 1 percent of the laser beam 12. Initially, only laser beam 12 directed to the field lens 24 will be considered. As indicated by arrow A, a motor 22a is provided for rotating the polygon 22 about its axis 21. As polygon 22 rotates each of the mirrored faces 23 thereof deflects the laser beam 12 so as to successively produce single-dimensional long horizontal scans 49 of the focused spot across field lens 24.

The beam from field lens 24 is reflected off a mirror 26 onto a concave tilt mirror 28. The optical equipment is particularly designed to minimize astigmatism, spherical and other aberrations of the reflected beam from mirror 28 in order to obtain an accurately positioned raster 50 of horizontal scan lines on field lens 42 generated as the tilt mirror 28 is tilted about its horizontal axis 30, as indicated by arrow B, by energizing a motor 28*a*. If as in some systems the mirror 28 were flat and an auxiliary lens next to the mirror was used to image the horizontal scan lines 49 from field lens 24 to form raster 50 on field lens 42, then the scanning beam as controlled by the rotating of the scanning polygon 22 and the tilting of the tilt mirror 28 would move across this lens in such a manner that undesirable aberrations would be produced. The use of a concave mirror 28 for both the functions of a vertical scanner and as a relay lens eliminates the necessity of using scanning lenses with large diameter beams, and results in a diffraction limited spot at field lens 42. In addition, the beam distance from lens 24 to tilt mirror 28 is equal to the beam distance from tilt mirror 28 to field lens 42, which distance is made equal to the radius of curvature of the concave mirror 28 in order to reduce the spherical aberrations from the mirror 28. Furthermore, the failure of the lens to form a point image of a point object is minimized by restricting the angle G between the incident and reflected beam of the tilt mirror 28 to 3° or less and any remaining astigmatism is further reduced by inserting a slight convex bend in the mirror 26.

Having described how a two-dimensional scanning raster 50 is provided by the focused laser beam spot, it will now be explained how the laser scanning raster 50 produced at the field lens 42 is transferred to a recording medium 46, via a recording lens 44. Since it is of considerable importance to obtain a high efficiency energy transfer to the recording medium 46, substantially all the rays intercepted by the field lens 42 are directed into and substantially fill the entrance of the recording lens 44. However, the achieving of this important result is complicated by the scanning motion provided by the scanning polygon 22 and the tilt mirror 28. To overcome this difficulty, field lens 42 is designed and located so as to form an image of the spot of light reflected from tilt mirror 28 at the entrance pupil of recording lens 44 and substantially matched to the size of the pupil. By so imaging the spot of light on tilt mirror 28, the scanning motion at the entrance pupil of recording lens 44 is virtually eliminated, since the spot of light horizontally scanning tilt mirror 28 is continuously imaged on the recording lens 44 with only the angular direction of the beam changing as the beam forms the raster 50 on field lens 42.

Continuing with the description of the system of FIG. 1, recording lens 44 is a compound lens that is located and designed to project, on recording medium 46, a reduced image 51 of the two dimensional scanning raster 50 on the field lens 42. The flat field produced by the recording lens 44 maintains the projected raster image 51 in focus at all points of the recording field on the high resolution recording medium. Also, in order to obtain a reduced, high resolution scanning raster, the recording lens 44 has a sufficiently high numerical aperture, e.g., 0.33, which is compatible with the desired reduction and resolution of the recorded image. By having field lens 42 image the moving spot of light it receives from mirror 28 at the entrance pupil of the recording lens 44, as already described, the design burden on the recording lens 44 is significantly reduced, since the recording lens diameter need not be made unnecessarily large to account for the scanning motion required to obtain a scanning pattern.

Figure 7:
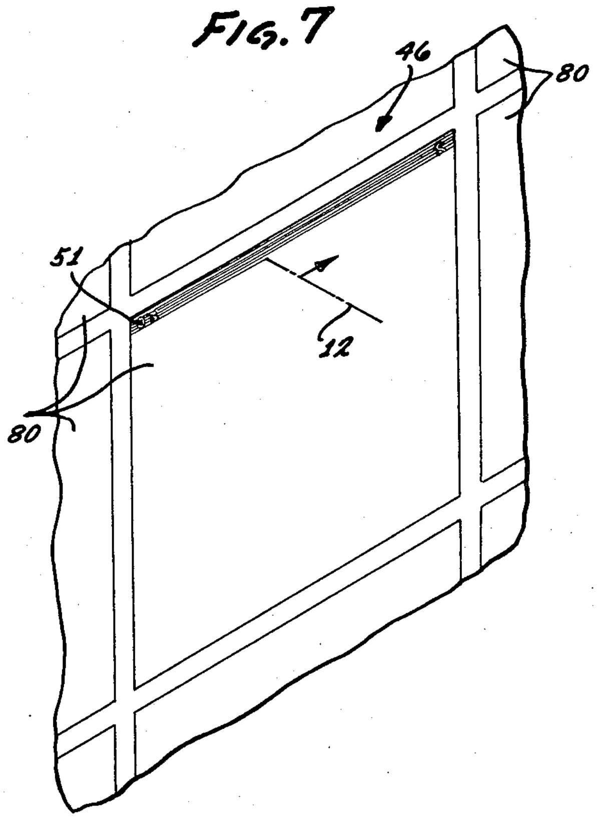
FIG. 7 is an enlarged view of a portion of the recording medium showing a frame on which a microform of a page of information is being recorded by the scanning laser beam.
Figure 8:
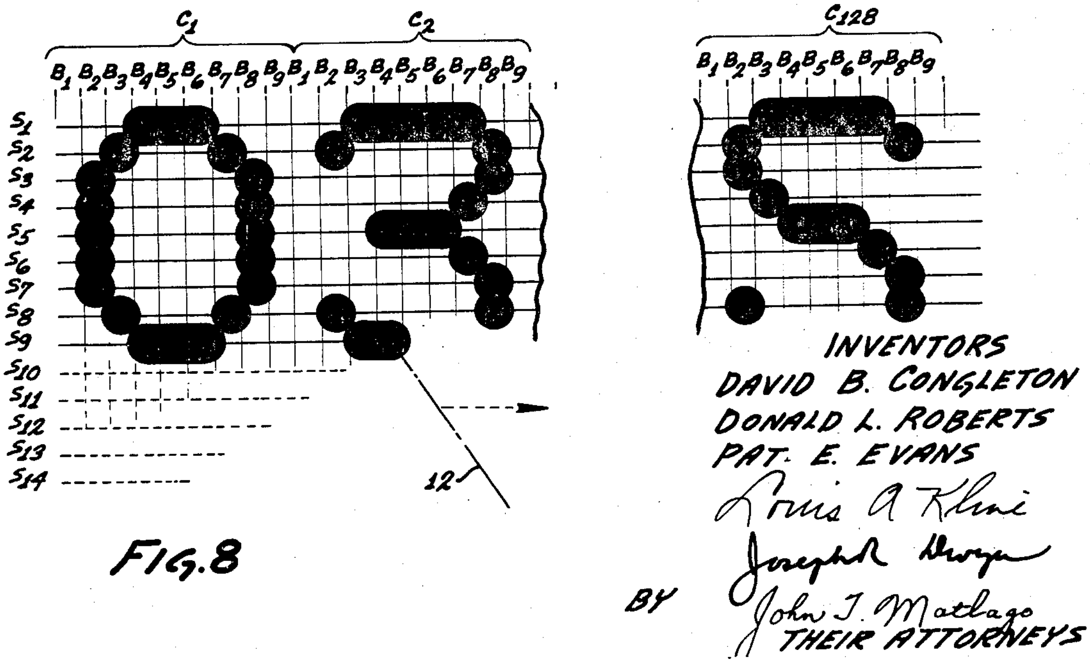
FIG. 8 is an enlarged view of the characters as recorded in a row of a frame of the recording medium in piecewise fashion by the system of the invention.

The reduced image 51 of the raster 50 forms a scanning pattern of horizontal scan lines which traverses over any one of a large number of optical recording frames 80 arranged in rows and columns on the recording medium 46. Suitable positioning mechanism 48 is provided for positioning the recording medium 46 in the vertical and horizontal directions indicated by respective arrows C and D so as to permit recording in a selected one of the recording frames 80. FIG. 7 is an enlarged illustration of a 3.0 millimeter square area forming an optical recording frame 80 and shows the image 51 of the scanning raster 50 that the laser beam 12 follows in scanning the recording frame. FIG. 8 which will be further considered later on, more particularly illustrates the manner in which a row of characters is formed as the laser output is modulated as the beam 12 scans a raster over the frame 80 by depicting an enlarged portion of the recording frame 80 shown in FIG. 7. The size of the characters shown relative to the area of frame 80 is greatly enlarged for purposes of illustration. A frame 80 provides for the recording of a page of data. Thus, in the described embodiment wherein the characters are 16.4 microns in height, as many as 128 characters can be placed along the same horizontal row and 81 such rows of characters can be placed on the 2.1 by 1.85 millimeter area of a recording frame 80. The laser beam is positioned at the desired starting point closely adjacent to the top edge of the optical frame 80 by first providing the proper rotative signals to the motor **28*a* for the tilt mirror 28. As each mirrored face 23 of the rotating polygon 22 reflects the laser beam, a horizontal scan line 49 is produced sufficient to traverse the entire width of the optical frame 80, a distance of about 1.85 millimeters. The motor 28*a* for the tilt mirror 28 is designed to produce the vertical movement of the beam across the optical frame 80 to cause the raster 50 of horizontal sweeps to be imaged on the frame 80 on medium 46. The beam 12 is moved across the frame 80 on the recording medium by the mirrored faces 23 of polygon 22 in a single horizontal direction and in evenly spaced scans from the top toward the bottom of the frame 80. The modulator 14 is controlled to gate the laser beam 12 to record portions of each of the characters in a row as the horizontal scan lines produced by the rotating polygon 22 are vertically deflected across a frame 80 of medium 46 by the movement of the tilt mirror 28** as indicated in FIG. 7.

It should be noted that the laser beam is initially positioned by the tilt mirror 28 above the top edge of the optical frame 80 such that as the horizontal scan line begins to move down the frame it is detected by a light guide 53 and photocell **54*a*. The light guide 53 is mounted on lens 42 to intercept the laser beam when it is at the upper point of the recording area of the frame and divert the beam to the photocell 54*a*. The photocell is thus activated by the light exposure to produce a vertical sync pulse on lead 58** which is synchronized to indicate the start of the scanning over the recording area of a frame.

Returning now to a consideration of subsidiary beam **12*a* at the output of beam splitter 32 in FIG. 1, it is initially to be understood that the movement of beam 12*a* past a shutter 34 corresponds to the movement of beam 12 past the recording area of the frame. A narrow apertured slit 35 in shutter 34 provides a passage for the light beam to a photocell 37 having a lead 39 which supplies a pulse denoting the presence of the light beam on the photocell. When a polygon mirror surface 23 first moves into the position of the laser beam 12, the angle of the leading edge of the mirror face enables the split-off beam 12*a* to be focused at the slit 35. Thus, the apertured slit 35 is positioned on the shutter 34 so that the light beam 12*a* crosses the photocell 37 as the light beam 12 starts each horizontal scan across a recording frame 80. In this manner, successive horizontal sync pulses are obtained on lead 39 from the photocell 37 which pulses are synchronized to indicate the start of each horizontal scan of the light beam 12 focused by recording lens 44 on the recording medium 46**.

The above described system provides a combination which is capable of converting, at high efficiency, substantially the entire output of a laser into a highly reduced focused spot of 2 microns or less on the recording medium 46, which spot can be controllably scanned so as to form the two-dimensional row-by-row scanning pattern on a frame 80 of the medium 46 having a flat field of, for example, 2.1 millimeters by 1.85 millimeters. Since substantially the entire laser output energy, aside from transmission losses and the energy diverted by the beam splitter 32, is converted to such a small spot, the laser energy per unit area applied to the recording medium 46 is unusually large. Accordingly, it becomes possible, by proper choice of the recording medium 46, to cause the highly reduced spot of 2 microns or less from the rapidly scanning beam to effect changes in the recording medium 46.

The recording medium 46 comprises a thin film of dyed plastic on a glass substrate. The thickness of the recording film is less than 2 microns. The dye which absorbs the laser energy is one of the triphenyl methane class, in a solid solution in a thermoplastic binder. The binder is given improved stability by the incorporation of suitable additives. By adjustment of the ratio of dye to binder in the recording film, the optical density to visible light can be adjusted to a level fulfilling both recording speed and image background contrast requirements. For the present invention the appropriate dye is one which becomes completely discolored as a result of the absorption of laser energy. The temperature rise of the plastic induced by the high intensity light of the laser beam discolors the plastic film creating transparent areas where the laser beam 12 is gated. As will be more clearly described hereinafter, gating of the laser beam 12 is controlled in modulator 14 by appropriate pattern waveform signals and timing to create an image of the row of characters on the recording medium.

Reference will next be made to FIG. 2 which shows the sixteen character set that is utilized by the laser microimage recording system of the present invention. The set includes the numerals 0 through 9 and six other non-numeric symbols each of which is graphically formed on a 7 × 9 matrix. As shown more particularly, for example, by the character "0" in FIG. 8, the matrix comprises 7 horizontal bits designated $B_2$ —$B_8$ and 9 vertical bits designated $S_1$ — $S_9$. Each graphical character is also identified as a four bit binary code that is unique for that particular character. The four bit binary codes identifying each of the characters are shown below the graphical recordings of the respective characters depicted in FIG. 2.

Figure 3:
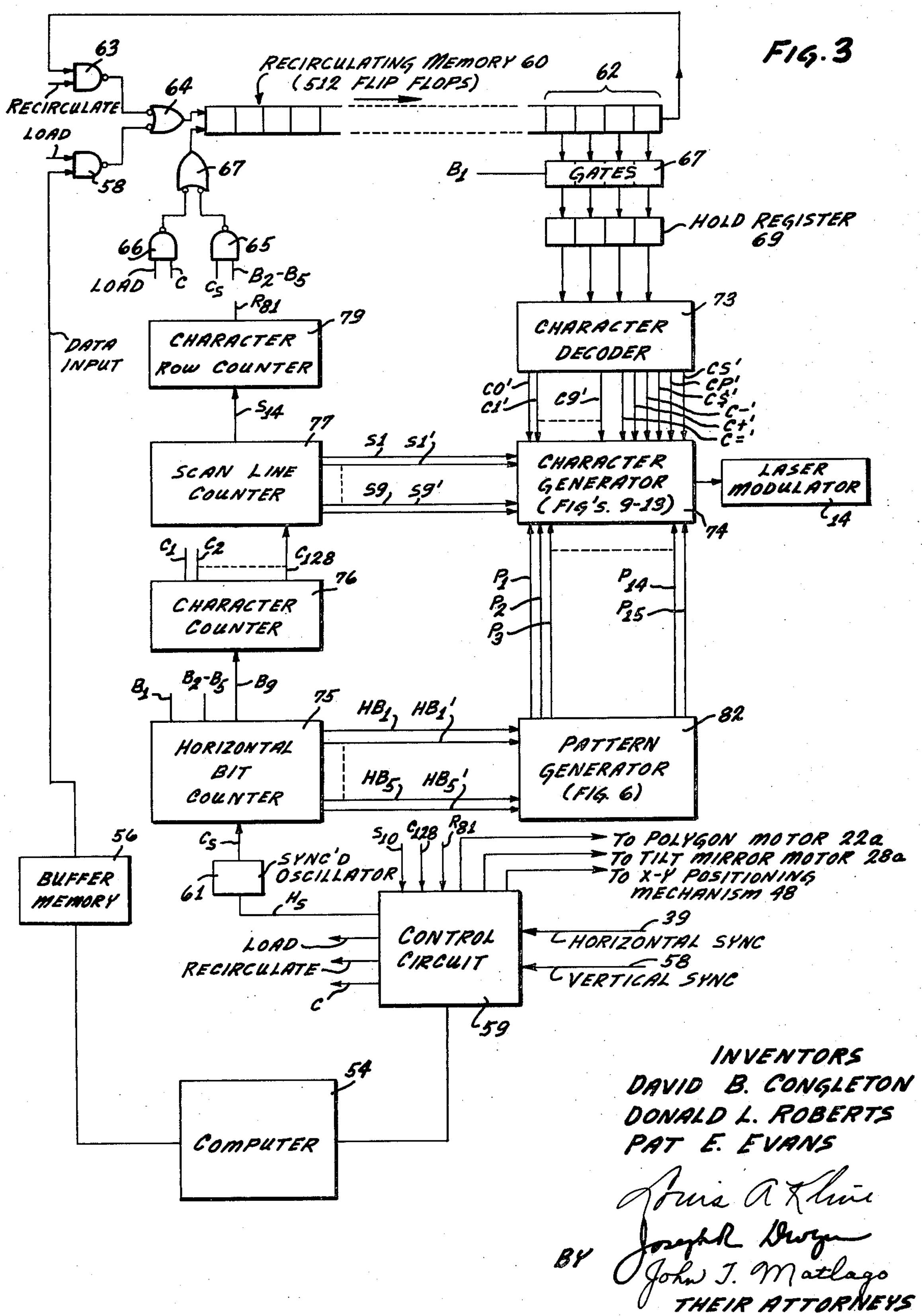
FIG. 3 is a simplified block diagram of the electronic circuits associated with the laser microform recorder including the computer equipment tie-in arrangement therefor.

It should be understood that the four bit binary codes in FIG. 2 corresponding to each of the characters are processed by or generated in the computer 54 (FIG. 3). The logical circuits of the present invention provide pattern waveforms in response to these binary coded characters which waveforms correspond to the shapes of horizontal slices of the graphical forms of the characters as shown in FIG. 2. These pattern waveforms are serially fed to the modulator 14 for controlling the laser beam 12 as it sweeps past a frame on the recording medium 46 to form thereon the graphical recordings of the characters as shown in FIG. 2. It should be further understood that the set of characters described is merely exemplary and that other symbols such as additional alpha characters, can be formed in a similar manner by combining horizontal patterns of waveforms in accordance with a scan in raster form like that of a television receiver.

Referring next to FIG. 3, block diagrams of the electronic circuits associated with the microform recorder of FIG. 1 are shown. These circuits include a serial recirculating memory 60 for storing the binary coded characters received from the computer 54 and a character generator 74 for converting these binary coded characters to signals for modulating the laser beam 12 to enable the microform recorder of FIG. 1 to record the graphical forms of the characters as shown in FIG. 2. The computer 54 digitally processes the data in binary coded character form using the four bit code shown in FIG. 2. When it is desired to print out this data the computer 54 transfers a group of binary coded characters, equivalent for example to a page of data that is to be recorded on a frame 80 of the medium, to a buffer memory 56. Thus, for the embodiment shown, the buffer memory is capable of storing a total number of bits equal to the number of bits per character row multiplied by the total number of character rows per frame. It should be appreciated, however, that the buffer memory 56 may only have the capacity to store a total number of bits equal to the number of bits in a single character row in which event the computer 54 would have to transfer to the buffer memory 56 a new group of binary coded characters for recording in each of the rows of the frame.

The control circuit 59 of the laser microform recording system generally accepts two kinds of command signals from the computer 54. The first of these signals relate to the move command which initiates circuits to cause the recording medium 46 which is coated on a 5 by 7 inch glass plate, for example, to be positioned by the X—Y page position mechanism 48 to the desired frame 80 location. The second of these signals relate to the record command which initiates the electronic circuits to cause data information in the serial recirculating memory 60 originating in the computer 54 to be converted by the character generator 74 into pattern waveform signals which are used to modulate the laser beam 12 in order to graphically record the characters in a row on a frame area of the medium 46.

Thus the computer 54 initially sends move command signals to the control circuit 59 indicating that a microform of the page of data in the buffer memory 56 is to be made on a selected frame 80 of the recording medium. Accordingly, the control circuit 59 positions the recording medium 46 by activating the X—Y positioning mechanism 48 in accordance with these command signals from the computer 54 such that the desired frame 80 is in position to be recorded thereon.

The recirculating memory 60 shown in FIG. 3 comprises a series circuit arrangement of 512 integrated circuit flipflops each arranged to step information to the following flipflop in response to a clock pulse C or $C_s$. The recirculating memory 60 is thus a recirculating shift register of such a length that it serially stores the four bit binary coded characters of all the characters to be graphically recorded as a microform recording on the 128 character positions of a single character row across frame 80 by laser beam 12 as shown in FIGS. 7 and 8. Thus, in response to a record command from the computer 54, the control circuit 59 generates a "load" signal which causes binary coded characters for a row of recording to be serially transferred from the buffer memory 56 via nand gate 58 and nor gate 64 to the recirculating memory 60. Clock pulses C are gated through nand gate 66 and nor gate 67 to advance the data in memory 60 during this load operation.

In accordance with the scheme of the present invention as illustrated in FIG. 8, a horizontal slice of an entire row of graphical characters, corresponding to the row of binary coded characters in memory 60, is recorded each time the laser beam 12 horizontally sweeps across the frame 80. The 128 character areas or positions in a row are designated $C_1$ to $C_{128}$, inclusive. Thus during a first horizontal scan $S_1$ of the laser beam 12 across frame 80 the top slice only of the first character "0" in the $C_1$ position of the row is recorded followed by the top slice only of the second character "3" in the $C_2$ position of the row and continuing on with the top slice recording of each of the remaining 128 characters in successive positions in a row. During the next horizontal scan $S_2$ of the laser beam which is vertically spaced below the first horizontal scan $S_1$ another slice of each of the characters in the row is recorded, and during the following and each of the succeeding horizontal scans $S_3$ to $S_9$ of the laser beam, each of which is vertically spaced below the previous scan, additional slices of the characters in the row are recorded. Forming the characters in this fashion on medium 46 requires that the four bit binary codes for all 128 characters being recorded in a row be made available from the recirculating memory 60 once for each of the horizontal scans $S_1$ to $S_9$, inclusive, of the laser beam 12. Furthermore as will be explained more clearly hereinafter, the character generator 74 must in response to each binary coded character provide a pattern waveform corresponding to the shape of the horizontal slice of each of the graphical characters for the entire row of characters to be recorded on a frame 80. These pattern waveforms must be in the proper sequence and synchronized with the movement of each horizontal scan of the laser to form the desired overall graphic shapes of the characters. Stated otherwise, the logic in the character generator 74 must convert the computer binary coded character data in the recirculating memory 60 into a stream of pattern waveform signals which is fed to the modulator 14 to control the recording laser beam 12 as it moves along the medium 46 to piecewise record the graphical characters in a row.

The counting circuits provided for synchronizing and controlling the character generator 74 to enable the laser beam 12 to be properly modulated for actually forming alphanumeric characters on the record medium in response to the binary coded characters are shown in FIG. 3. These counting circuits include a character counter 76 for counting character positions or spaces on the horizontal scan line, a horizontal bit counter 75 which counts horizontal elements within a character space, and a scan line counter 77 for counting the vertical elements in the character space. As previously described, the recirculating memory 60 is of such a length that it serially stores the four bit binary codes of all the 128 characters to be recorded in a single horizontal row of the frame 80. During the record operation the binary coded data is advanced in memory 60 by clock pulses $C_s$ and, in response to a "recirculate" signal on the input of the memory 60, is recirculated by way of nand gate 63 and nor gate 64 back into the input of the memory 60. The binary coded data in the memory 60 recirculates at the rate of once each horizontal scan of the laser beam and this rate must be precisely synchronized with each horizontal scan of the laser beam to properly record the graphic characters without slanting, for example. In order to provide the synchronized pattern waveforms required to successively record a horizontal slice of each of the characters in a row, as each of the four bit binary coded characters is advanced into the last four flipflops 62 of the memory 60, parallel signals corresponding thereto are successively transferred by way of gates 67 into a hold register 69. The gates 67 are triggered by $B_1$ signals from the horizontal bit counter 75 just prior to the time intervals $B_2$—$B_8$ allotted for the generation of the pattern waveforms used to record a portion of the designated characters. The purpose of the hold register 69 is to enable all four bits of a particular binary coded character to be simultaneously made available to the character decoder 73. The decoder 73 decodes the binary coded character to provide on one of the selected outputs C0′, C1′, etc., thereof, corresponding to the binary coded character a negative potential signal which is sensed by the character generator 74 during the period $B_2$—$B_8$ to select a pattern waveform corresponding to a portion of the shape of the graphical character being recorded on the medium 46 by the laser beam 12.

Figure 5:
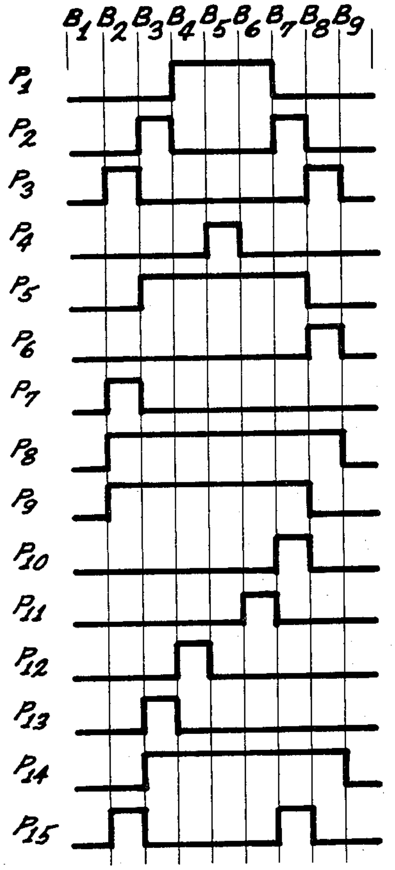
FIG. 5 shows graphs of the pattern waveforms that are used to form the recorded characters.

In order to facilitate the implementation of the character generator 74 for converting the binary coded characters as generated by the computer 54 to pattern waveforms useful for graphically recording portions of the characters on recording medium 46, the pattern waveforms that are fed from the output of the character generator 74 to the laser modulator 14 are standardized in the form of a set of 15 different pattern waveforms $P_1$, $P_2$ — $P_{15}$ from which all of the 16 characters of the present system shown in FIG. 2 can be effectively synthesized. These 15 pattern waveforms are shown in FIG. 5. As previously noted, each character is digitally formed in a matrix area comprised of seven horizontal bit positions and nine vertical bit positions. The pattern waveforms $P_1$, $P_2$ — $P_{15}$ represent the horizontal bit position waveforms, a selected one of which may be applied to the modulator 14 as the laser beam 12 scans each of the 128 character positions along a horizontal row of a frame 80. It should now be clearly understood that a character is formed in each 7 × 9 matrix during counts $B_2$ — $B_8$ of the horizontal bit counter 75 and during counts $S_1$ — $S_9$ of the scan line counter 77.

In order to describe the operation of the counting circuit shown in block diagram in FIG. 3 it should be noted that when a record command is received in control circuit 59 from the computer 54, the control circuit 59 initiates the motor **22*a* of the polygon 22 and the motor 28*a* of the tilt mirror 28. As the laser beam 12 is deflected off each of the mirror surfaces 23 it starts to horizontally scan a frame 80 of the recording medium 46. As the beam is successively deflected across the frame 80 by the successive mirror faces 23 of polygon 22 the tilt mirror 28 vertically deflects the beam 12. As previously described, when the beam 12 passes the light guide 53 on the upper end of lens 42 it energizes the vertical sync photocell 54 and causes a vertical sync pulse to be generated on line 58. This vertical sync pulse is routed to the control circuit 59. Each time the beam 12 starts to horizontally scan the frame as a result of being reflected off a mirrored surface 23 of rotating polygon 22, the subsidiary beam 12*a*, split off of the beam 12, passes through slit 35 to the photocell 37 and causes a horizontal sync pulse to be generated on lead 39. After the vertical sync pulse has been received by control circuit 59 indicating that the scanning beam 12 has been lowered by tilt mirror 28*a* to a position to start recording along the upper portion of frame 80, each horizontal sync pulse on lead 39 which is synchronized with the start of the horizontal movement of the beam is sent to the control circuit 59. Upon receipt of each horizontal sync pulse on lead 39, the control circuit 59 provides a horizontal sync signal $H_s$ to the oscillator 61 which in response thereto generates clock pulses $C_s$ which are used to synchronize the timing of the operation of the circuits associated with the character generator 74 with the advancement of the binary coded characters in the recirculating memory 60 and in synchronism with the movement of the laser beam 12 across the frame 80. More particularly, the clock pulses $C_s$ advance the electronic counting circuits 75 and 77 to operate the pattern generator 82 and to provide scan line signals $S_1$ — $S_9$ to the character generator 74 in synchronism with the binary coded characters in the recirculating memory 60**.

Thus, the pattern waveform signals generated on the output of the character generator 74 are in synchronism with the movement of the horizontal scanning beam 12 so as to be able to record a row of characters in a piecewise fashion on the recording medium 46. In the particular embodiment described a group of 1152 clock pulses $C_s$ are provided by the oscillator 61 to the horizontal bit counter 75 in response to each horizontal sync signal $H_s$. The sync signal $H_s$ is a waveform generated in control circuit 59 which is initiated by a horizontal sync pulse on lead 39 and terminated by a signal $C_{128}$. These clock pulses $C_s$ are fed into the horizontal bit counter 75 which cycles through the $B_1$ to $B_9$ count positions to identify the horizontal bit elements of the successive character areas in which each of the 128 characters is recorded. It should be noted that each character is actually recorded during counts $B_2$ through $B_8$ of counter 75 and that the specific counts $B_1$ and $B_9$ provide the spacing between the character areas in the row. Each $B_9$ output of the horizontal bit counter 75 actuates the character counter 76 where outputs $C_1$, $C_2$ — $C_{128}$ indicate the 128 character positions of the characters to be recorded on each row of the frame 80 during a single sweep of the laser beam 12 by a mirror face 23 of the polygon 22. Each time the character counter 76 cycles through 128 counts it actuates the scan line count 77 which cycles through a count of 14 scan lines $S_1$ to $S_{14}$ to define the vertical spacing of the successive scan lines allotted for each row of characters. The character is recorded during scan lines $S_1$ through $S_9$ of scan line counter 77, and scan lines $S_{10}$ through $S_{14}$ of counter 77 are used for spacing between the rows of characters on the frame. It should be noted that after a row of characters have been fully recorded, as evidenced by the scan line counter 77 indicating that the $S_9$ scan line has occurred, in response to a "load" signal from control circuit 59, binary coded characters corresponding to the next row of characters are transferred from the buffer memory 56 to the recirculating memory 60 during the blank scan line counts $S_{10}$ through $S_{14}$. The character row counter 79 counts the $S_{14}$ outputs to keep track of the character rows being recorded on the frame 80. In the present invention 81 rows of characters are provided for each frame. The tilt mirror 28 scans the laser beam vertically progressing from the top of each frame to the bottom thus spacing the horizontal scan lines to form a raster of 1134 lines per frame. The downward scan of the tilt mirror 28 occupies one page or frame recording time which is evidenced by a signal $R_{81}$ from character row counter 79. In response to a signal from control circuit 59 which senses signal $R_{81}$, the tilt mirror motor *28a* is then energized to return tilt mirror 28 to deflect the laser beam to the top of the (next) page or frame.

Figures 4, 13:
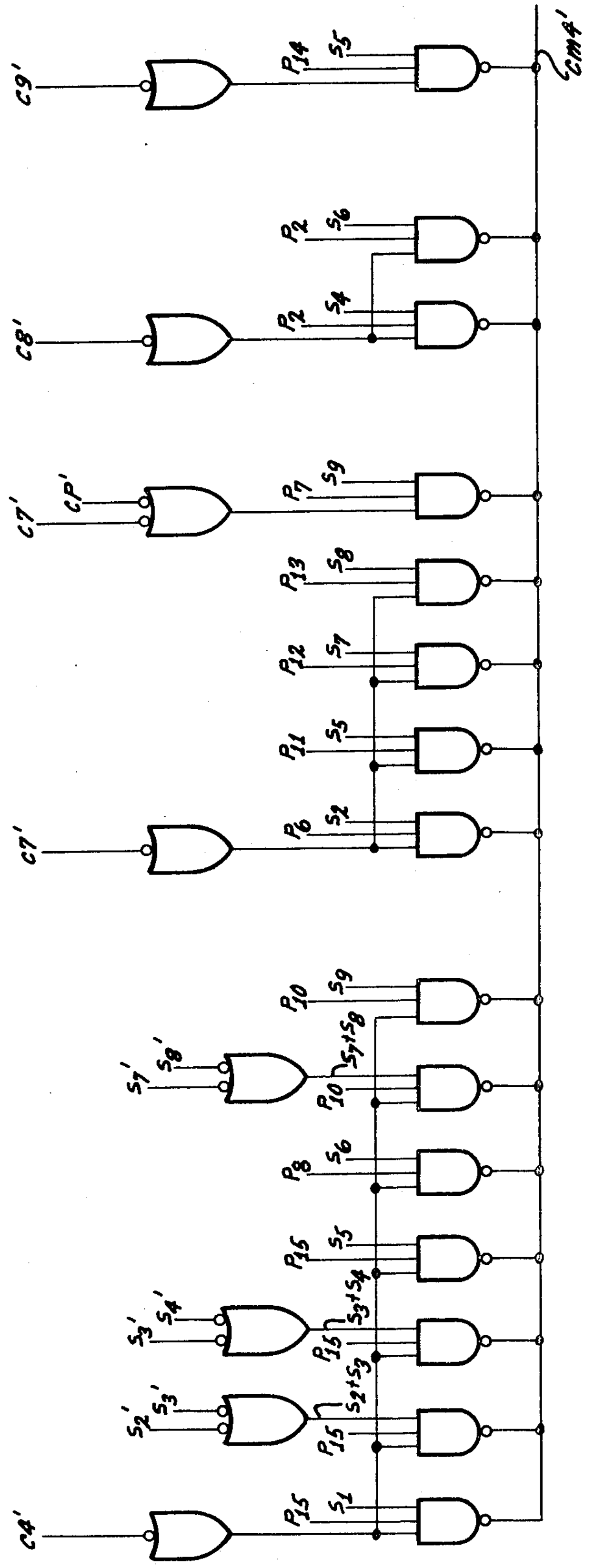
FIG. 4 is a binary table showing the states of the outputs of the flipflops of the counter for defining each of the horizontal bit counts.
FIGS. 10 through 13 are schematic diagrams of the character generator logical networks for mechanizing the logical equations shown in FIG. 9.
Figure 6:
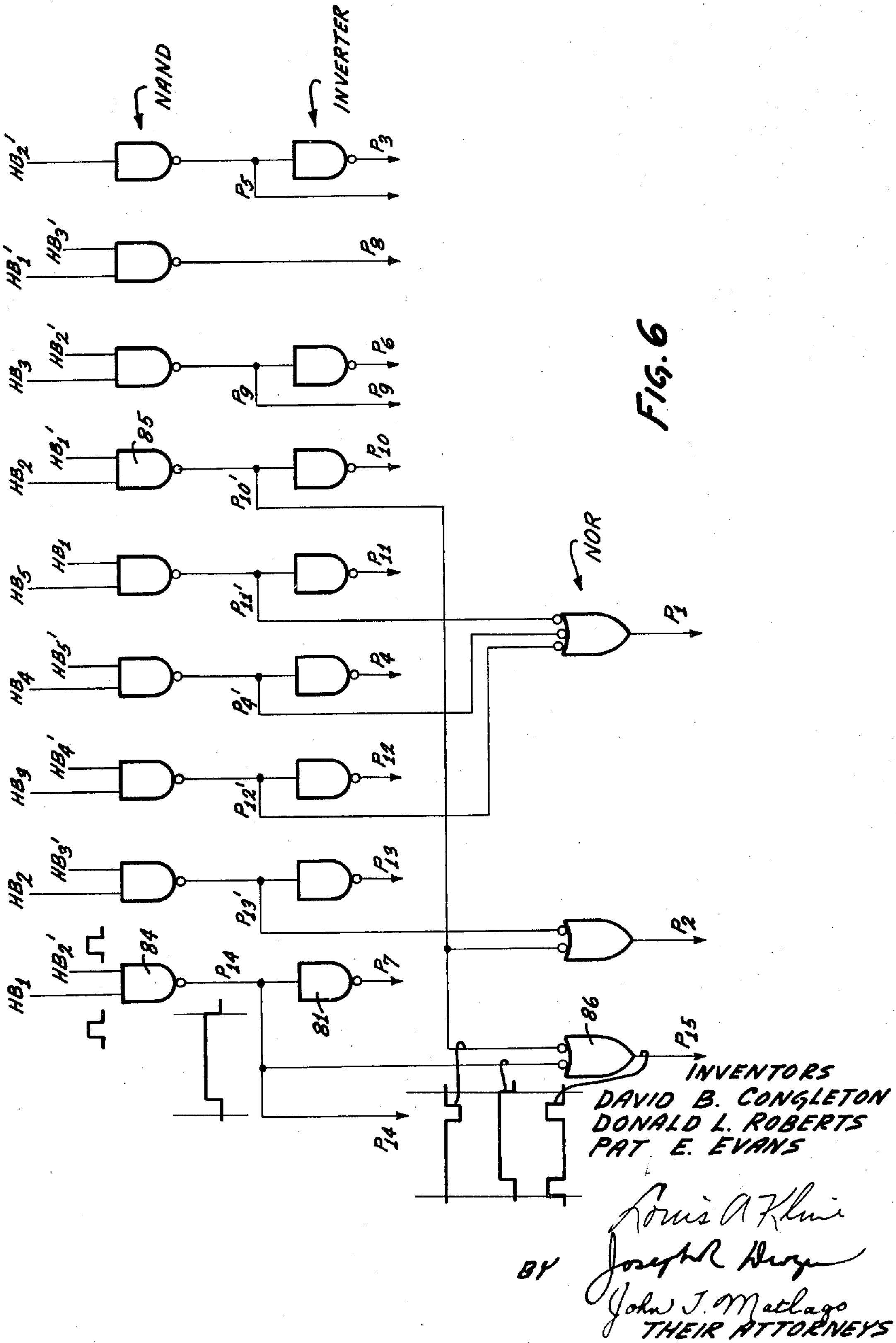
FIG. 6 is a schematic circuit diagram of the pattern generator for generating the pattern waveforms shown in FIG. 5.

The horizontal bit counter 75 is employed to provide inputs to a pattern generator 82 shown in FIG. 6 for continuously generating the set of 15 standard pattern waveforms $P_1$, $P_2$ — $P_{15}$ from which all the characters of the set are graphically formed for recording on the medium 47. The set of pattern waveforms from which all the characters can be thus synthesized is shown in FIG. 5. Note that each of the pattern waveforms defines the shape of a horizontal slice of a character for the period defined by the counts $B_2$ to $B_8$, inclusive, of the horizontal bit counter. The pulse pattern waveforms are represented by a high voltage in any one or more of the respective bit counts $B_2$ — $B_8$. Accordingly, as shown in FIG. 6, each of the pattern waveforms designated $P_1$, $P_2$ — $P_{15}$ is generated in the pattern generator 82 by combining selected outputs $HB_1$, $HB_1'$, $HB_2$, $HB_2'$ — $HB_5$, $HB_5'$ of the five flipflops HB1, HB2, — HB5 comprising the horizontal bit counter 75. The combined states of the selected outputs of these five flipflops which represent each of the horizontal bit counts $B_1$ to $B_9$, inclusive, is shown by the binary table in FIG. 4. These outputs are combined in positive nand circuits to generate the pattern waveforms $P_5$, $P_8$, $P_9$ and $P_{14}$ while inverted forms of the outputs of these nand circuits are employed to generate the pattern waveforms $P_3$, $P_4$, $P_6$, $P_7$, $P_{10}$, $P_{11}$, $P_{12}$, and $P_{13}$. The remaining pattern waveforms $P_1$, $P_2$, and $P_{15}$ are formed by combining the pattern waveform outputs of the positive nand circuits in negative nor circuits. Thus note that count $B_2$ is uniquely characterized by flipflop HB1 being in a true state and flipflop HB2 being in a false state. The waveform outputs $HB_1$ and $HB_2'$ of these two flipflops are combined in positive nand circuit 84 which provides a low potential on the output thereof when both the inputs are high in potential. Thus during count $B_2$ the pattern waveform $P_{14}$ is formed on the output of positive nand circuit 84. The pattern waveform $P_{14}$ is fed into inverter 81 which provides on the output thereof pattern waveform $P_7$. In the binary table of FIG. 4, the count $B_7$ is uniquely characterized by flipflop HB2 being in a true state and flipflop HB1 being in a false state. The waveform outputs $HB_2$ and $HB_1'$ of these two flipflops are combined in positive nand circuit 85 to form a pattern waveform $P_{10}'$ which when combined with the pattern waveform $P_{14}$ in negative nor circuit 86 provides the pattern waveform $P_{15}$. It should be noted that negative nor circuit 86 provides on its output an inverse of the waveform on either of its inputs.

As previously described, in response to a record command from the computer 54, a "recirculate" signal is sent from the control circuit 59 to open nand gate 63 to permit the data in the memory 60 to be recirculated while being advanced in response to the $C_s$ clock pulses. The $C_s$ clock pulses are gated through nand circuit 65, during the $B_2$—$B_5$ counts of each cycle of the horizontal bit counter 75, to the nor circuit 67 provided at the input of the recirculating memory 60. Thus after signals corresponding to the four bit code corresponding to a character in the memory 60 have been transferred at $B_1$ time to the hold register 69, the data in the recirculating memory 60 is advanced during $B_2$—$B_5$ such that the four bit code corresponding to the next binary coded character is positioned in the last four flipflops 62 for transfer to the hold register 69 during $B_1$ time of the following character interval.

Figure 14:
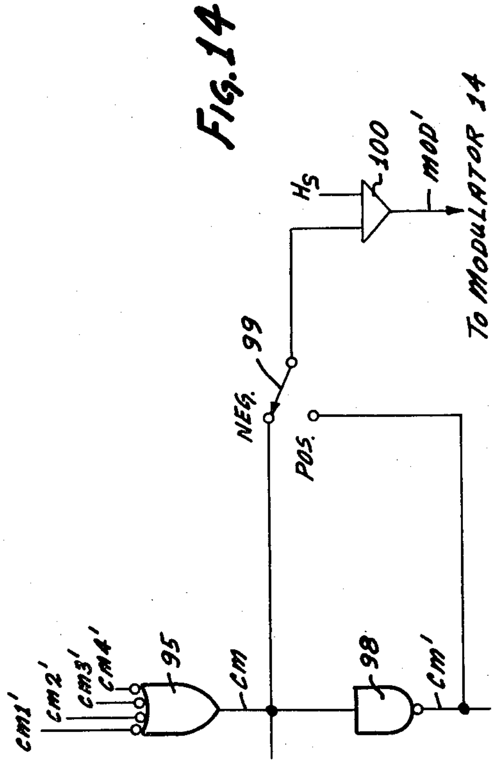
FIG. 14 is a schematic diagram of the circuitry for logically summing the outputs of the logical networks of the character generator shown in FIGS. 10 through 13.

The detailed logical circuitry for the character generator 74 will next be described. Referring to the block diagram of the circuits in FIG. 3, it will be noted that the generator 74 receives the output lines of the character decoder 73 corresponding to each of the characters of the set shown in FIG. 2, the output lines from the pattern generator 82 supplying the pattern waveforms $P_1$, $P_2$ — $P_{15}$, and the output lines of the scan line counter 77 supplying counts $S_1$ through $S_9$. These output lines are combined to form logical networks in the character generator 74, in accordance with the logical equations shown in FIG. 9, to supply the waveforms needed to form on the recording medium the different slices of portions of each of the characters as identified in recirculating memory 60. Note that each of the logical equations in FIG. 9 defines the operation of the character generator 74 in response to the four bit binary coded character presently in the hold register 69 which is decoded by character decoder 73. The output of decoder 73 is used to select the portions of the logical networks of the character generator which are rendered operable to route selected ones of the pattern waveforms $P_1$, $P_2$, — $P_{15}$ to the nor gate summing network 95 of FIG. 14 which is connected to modulator 14. The character generator 74 thus comprises logic gates prewired to supply pattern waveforms that form the shapes of the characters being recorded.

Figure 10:
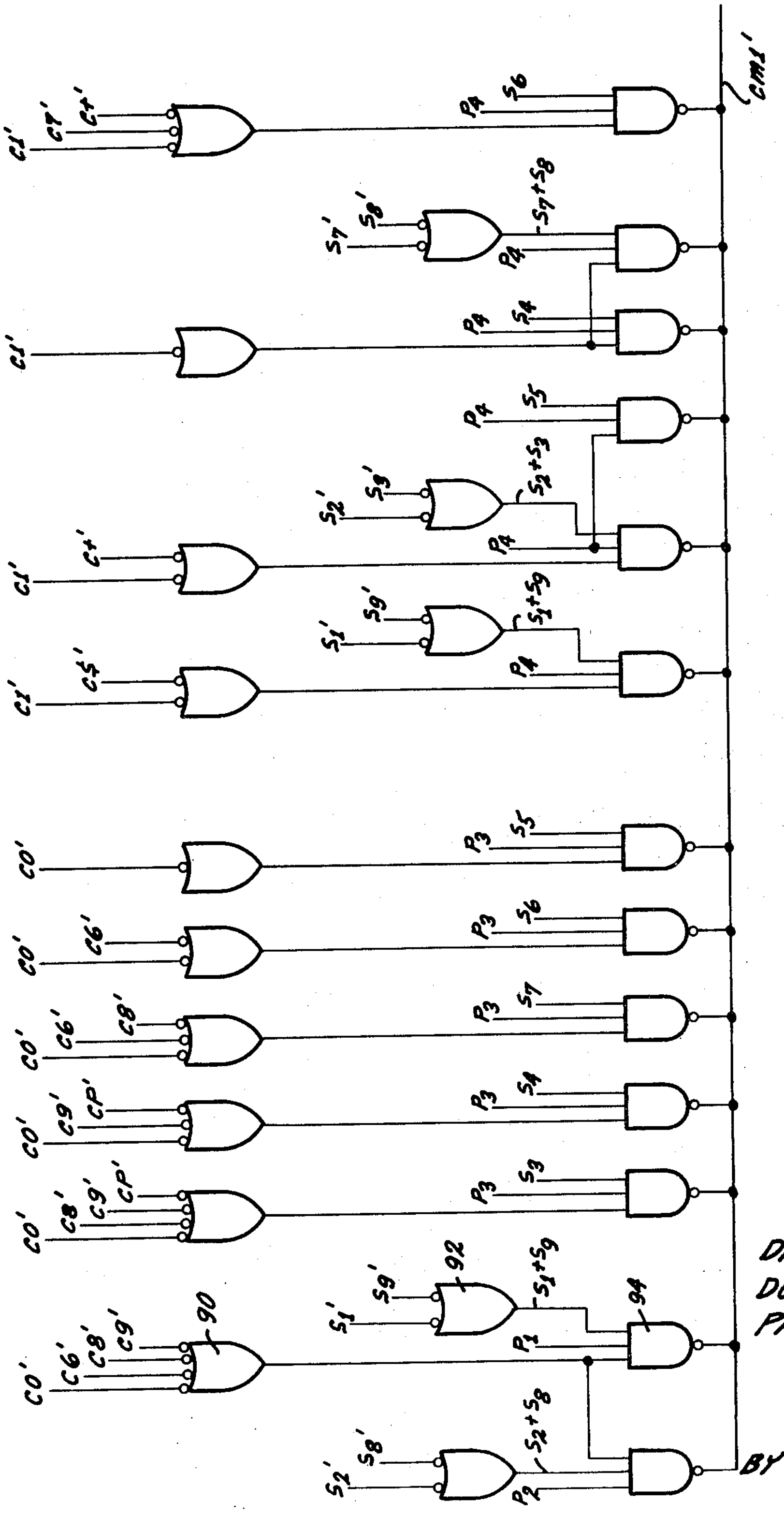
Figure 11:
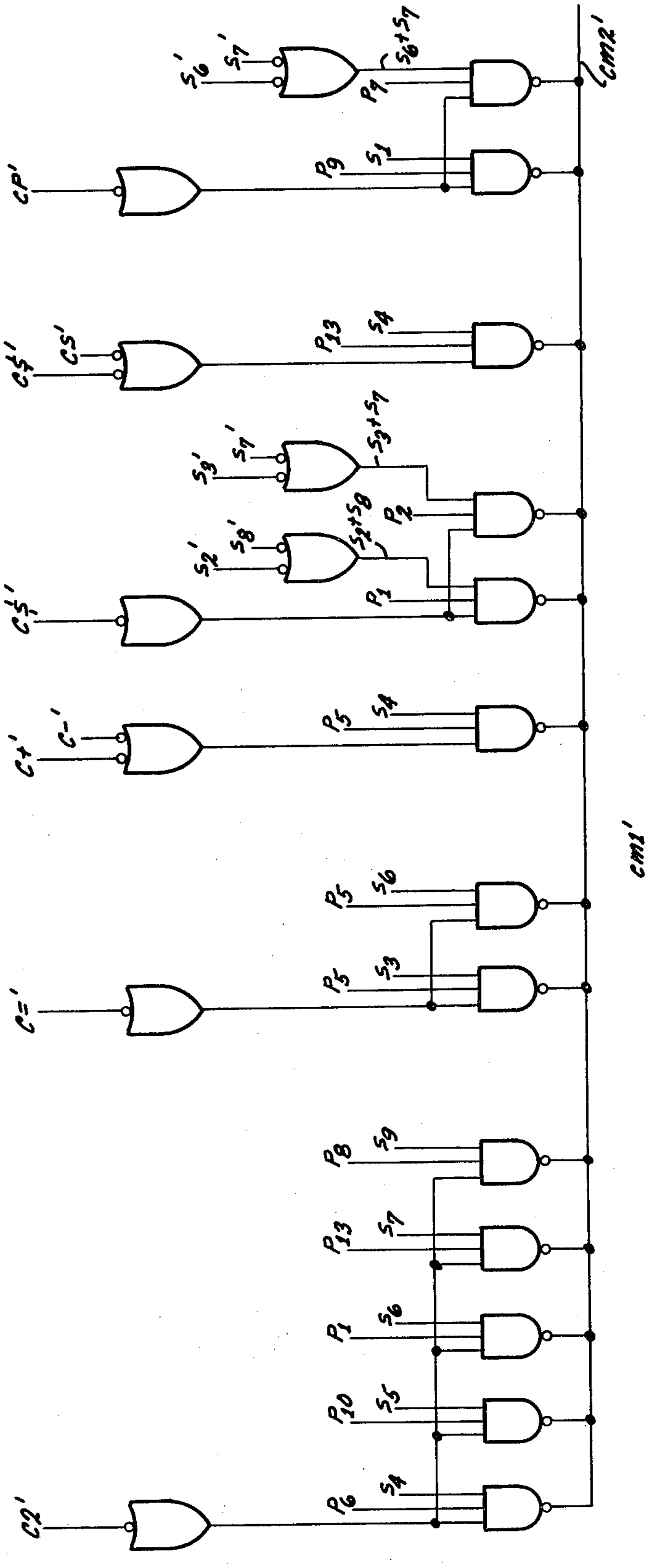

Thus as shown in FIG. 8 the pattern waveforms needed to graphically form each of the characters "0," "3" — "S" in a piecewise fashion on a row of the frame 80 are generated during each of the successive scan lines $S_1$ — $S_9$. In accordance with the previous description, when the binary code 0000 corresponding to the digit "0" is in the last four flipflops 62 of the recirculating memory 60, the binary code is transferred at $B_1$ time of character interval $C_1$ to the hold register 69 and causes the C0' output of the character decoder 73 to be low in potential to the exclusion of all the other outputs of the character decoder 73. In FIG. 9, the logical equation for character "0" indicates that to form this character during scan $S_1$, the pattern waveform $P_1$ is selected. As shown by the logical network in FIG. 10 which mechanizes this logical equation for character "0", the C0' output is inverted in nor circuit 90 to provide a high potential signal C0 on the input of nand circuit 94. Thus during scan line $S_1$, the $S_1'$ line is low in potential such that the nor circuit 92 which inverts its input provides a high potential signal $S_1$ on the output thereof. This signal $S_1$ along with the C0 signal effectively gates the $P_1$ waveform during $B_2$–$B_8$ through nand circuit 94 onto the cm1' line which is gated through the nor circuit 95 of FIG. 14 onto the modulator 14.

Figure 12:
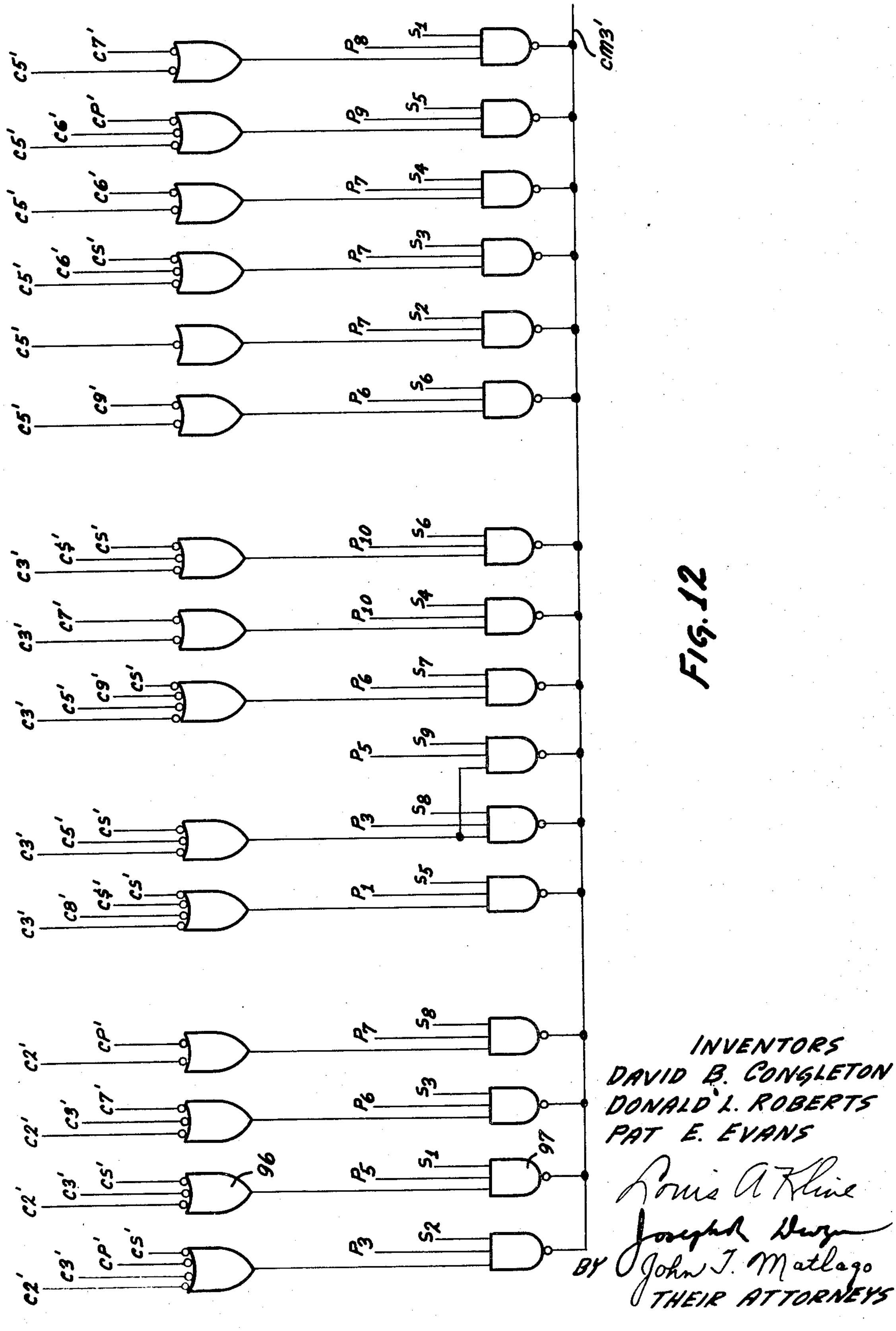

The next four bit binary coded character in the recirculating memory 60 is 0011 corresponding to character "3" which was advanced during $B_2$—$B_5$ of the previous character interval $C_1$ to the last four flipflops 62 of memory 60. Thus at $B_1$ time of the next character interval $C_2$, this code is transferred via gates 67 to the hold register 69 and causes the C3' output of the character decoder 73 to be low in potential to the exclusion of all the other outputs of the character decoder 73. In FIG. 9, the logical equation for character "3" indicates that to form this character during scan $S_1$, the pattern waveform $P_5$ is selected. As shown by the logical network in FIG. 12 which mechanizes the logical equation for character "3", the C3' output is inverted in nor circuit 96 to provide a high potential signal C3 on one of the inputs of nand circuit 97. Scan line $S_1$ and pattern waveform $P_5$ are respectively applied to the other inputs of nand circuit 97. Thus signal $S_1$ along with signal C3 effectively gates the $P_5$ pattern waveform through nand circuit 97 in inverted form onto the $cm_3'$ line which is again inverted upon being gated through the nor circuit 95 of FIG. 14 onto the modulator 14.

As the horizontal scan line $S_1$ continues to scan the frame 80 each of the remainder of the 128 binary coded characters in the last four flipflops 62 of recirculating memory 60 is successively transferred at $B_1$ times of the character intervals to the hold register 69 and upon being decoded in decoder 73 cause the logical network of the character generator to route pattern waveforms to the output thereof in the proper order to record the portions of the respective characters along the laser beam scan path on frame 80. Following the completion of the horizontal scan line $S_1$, the laser beam 12 is reflected off the next mirror surface 23 of the polygon 22, and generates a horizontal sync pulse which is used to resynchronize the oscillator 61 to generate clock pulses $C_s$ for advancing the horizontal bit counter 75 during the scan line $S_2$. Because of the continuous tilting of the tilt mirror 28 the path of the scan line $S_2$ is vertically spaced below the path of the scan line $S_1$ and each successive scan line $S_3$, $S_4$, etc. is likewise spaced below its previous scan line. Thus the character lines C0', C3' — CS' are again rendered effective as the four bit binary codes for these characters are advanced in the recirculating memory 60 and successively transferred to the hold register 69. These character lines from the decoder 73 along with the scan lines from the scan line counter 77, as logically combined in character generator 74 in accordance with the logical equations for each of these characters shown in FIG. 9, cause the pattern waveforms to be selectively routed to the nor circuit 95 in FIG. 14 and applied to the modulator 14 as the laser beam 12 sweeps past the frame 80.

It should be noted that the laser beam microform recorder provides for both positive and negative modes of recording of data in a frame 80. The recorder provides for the negative mode of recording of data when the laser beam operates to discolor, i.e., render transparent, the plastic film material forming the actual shape of the character being recorder. This provides clear characters on a dark background. The recorder can also provide for the positive mode of recording of data by having the laser beam operate to render transparent the background plastic film material but not change the film material forming the actual shapes of the characters. This provides dark characters on a clear background. A switch 99 in FIG. 14 can be set to either accept pattern waveform signals directly from the output of nor circuit 95 to perform the negative mode of recording or to accept inverted pattern waveform signals from inverter 98 to perform the positive mode of recording. The pattern waveform signals for either mode of recording provided at the output of switch 99 are gated through a modulator amplifier 100 by a horizontal sync signal Hs which, as described in connection with FIG. 3, is a waveform effective during the period that the clock pulses Cs are generated during each horizontal scan of the laser beam. Note that the modulator amplifier 100 serves to invert the input pattern waveform, provided by the character generator, however, the modulator 14 operates to turn the laser beam on when the waveform applied thereto is at 0 volts and to turn the beam off when the waveform is at +4 volts, and thus provides for recording on the recording medium in either the positive or negative mode as above described.

It will be apparent to those skilled in the art that many modifications, additions and variations may be made, both in the structure and operation of the exemplary embodiment presented herein, without departing from the spirit of the invention. Therefore, the present invention is not to be considered as limited to the disclosure presented herein, but is to be considered as including all possible modifications, additions and variations thereof coming within the scope of the invention as defined in the appended claims.

What is claimed is:

1. A computer output microform printing system comprising means for producing a laser beam; a recording medium; optical means for directing the laser beam onto said recording medium; said optical means including a rotating polygon having a plurality of mirror faces for reflecting the laser beam as a continuous series of horizontal scan lines, and a concave mirror tiltable about a horizontal axis for vertically deflecting the horizontal scan lines to form a raster of horizontal scan lines across said recording medium; means including a converter circuit responsive to a group of binary coded character signals as processed within a computer for generating a stream of pattern waveform signals for each of a plurality of said horizontal scan lines; each said stream of pattern waveform signals representing lines and dots comprising horizontal portions of the shapes of the graphic characters corresponding to said binary coded characters; and a modulator for modulating said laser beam in accordance with said stream of line and dot representing waveform signals during said plurality of horizontal scan lines for printing microimages of said graphic characters as a plurality of horizontal lines and dots piecewise in a vertical direction on said recording medium.

2. The invention in accordance with claim 1 including means for synchronizing the generation of said streams of pattern waveform signals by said converter circuit with the movement of said laser beam during each of said plurality of horizontal scan lines.

3. The invention in accordance with claim 2 wherein said recording medium is flat and wherein said optical means includes a recording lens for focusing a reduced image of said raster of horizontal scan lines in a flat field on said recording medium.

4. A computer output microform printing system comprising: means for providing a laser beam; a recording medium; optical means for directing the laser beam onto said recording medium; said optical means including a rotating polygon having a plurality of planar reflecting surfaces for reflecting said laser beam and providing horizontal scanning as a continuous series of long horizontal scan lines, a first field lens, a concave spot-forming tilt mirror deflecting said laser beam to provide a vertical scan, said spot-forming tilt mirror being arranged to deflect said laser beam less than 3°, a second field lens, said field lenses being equidistant from said tilt mirror and the radius of curvature of said spot-forming tilt mirror being equal to the distance between said field lenses and said spot-forming tilt mirror, and a recording lens adjacent said second field lens for directing said laser beam onto said recording medium; storage means for storing binary coded character signals corresponding to a row of graphic characters to be printed by said laser beam on said recording medium; character generator circuit means responsive to the binary coded character signals in said storage means for generating a stream of pattern waveform signals for each horizontal scan line, each said stream of pattern waveform signals forming lines and dots corresponding to a horizontal slice of the row of characters to be printed, said characters being composed of lines and dots along said horizontal scan lines; and a modulator for modulating said laser beam to record said lines and dots in accordance with said streams of pattern waveform signals during each of a plurality of horizontal scan lines, whereby the row of graphic characters is printed piecewise in a vertical direction on said recording medium.

5. The invention in accordance with claim 4 wherein said rotating polygon has a plurality of mirror faces, and wherein rotation of said polygon enables the successive mirror faces of the polygon to reflect the laser beam as a continuous series of long horizontal scan lines.

6. The invention in accordance with claim 5 including a polygon mirror face edge detector for producing a sync output signal corresponding to the start of each of the horizontal scan lines of the laser beam, said sync output signal being used to synchronize the operation of said character generator circuit means with the horizontal scanning movement of the laser beam across said recording medium.

7. The invention in accordance with claim 4 wherein said character generator circuit means is comprised of logical gates prewired to generate said streams of pattern waveform signals corresponding to the horizontal lines and dots comprising horizontal slices of the row of graphic characters.

8. The invention in accordance with claim 4 including a scan line counter for counting the horizontal scan lines, and wherein said character generator circuit means is further responsive to the count output of the scan line counter for selectively generating the streams of pattern waveform signals corresponding to the successive horizontal slices of the row of characters to be printed by the laser beam during each of a plurality of said horizontal scan lines.

9. The invention in accordance with claim 4 including means for synchronizing the operation of said character generator circuit means with the movement of the laser beam during each of a plurality of said horizontal scan lines.

10. The invention in accordance with claim 4 wherein said recording medium includes a transparent substrate having a thin film coating thereon which is optically modified in accordance with said modulated scanning laser beam for recording said row of characters.

11. The invention in accordance with claim 4 wherein said storage means includes a recirculating memory, and wherein the binary coded character signals corresponding to a row of graphic characters to be printed on said recording medium are recirculated once for each horizontal scan line to enable the character generator circuit means to successively respond to the binary coded character signals to supply the streams of pattern waveform signals corresponding to the lines and dots forming the horizontal slices of the row of characters to be printed.

12. The invention in accordance with claim 11 including a polygon mirror face edge detector for producing a sync output signal corresponding to the start of each of the horizontal scan lines of the laser beam, and wherein each said sync output signal is used to initiate the recirculation of binary coded characters signals in said recirculating memory in synchronism with the operation of said character generator circuit means and the horizontal scanning movement of the laser beam across said recording medium.

13. The invention in accordance with clam 11 wherein said character generator circuit means includes a pattern generator responsive to outputs of the horizontal bit counter for generating a set of standard pattern waveform signals representing combinations of lines and dots, selected ones of which are used to synthesize the graphic characters to be printed in a row on said recording medium.

14. The invention in accordance with claim 13 wherein said character generator circuit means includes a character decoder for decoding the binary coded character signals as they are recirculated in said recirculating memory.

15. The invention in accordance with claim 14 wherein said character generator circuit means includes logical networks responsive to successive binary coded character signals in said recirculating memory as decoded by said character decoder, the outputs of said scan line counter, and the set of standard pattern waveform signals generated by said pattern generator for selectively supplying the streams of line and dot representing pattern waveform signals corresponding to the respective horizontal slices of the row of characters to be printed by the laser beam during the successive horizontal scan lines.

16. The invention in accordance with claim 11 wherein a scan line counter is provided for counting the horizontal scan lines, wherein a buffer memory is provided for storing binary coded characters as received from a computer, and wherein control means is provided responsive to count outputs of said scan line counter for transferring a new group of binary coded characters corresponding to a row of graphic characters from the buffer memory to said recirculating memory during blank horizontal scan lines following the plurality of horizontal scan lines during which a row of characters is printed on said recording medium.

17. The invention in accordance with claim 4 including a horizontal bit counter providing outputs for defining the horizontal bit elements of the character areas along a horizontal scan line; a character counter responsive to said horizontal bit counter for providing outputs defining each of the character areas along a horizontal scan line; and a scan line counter responsive to said character counter for providing outputs for defining each of the horizontal scan lines.

18. The invention in accordance with claim 17 including a source of clock pulses, and a polygon mirror face edge detector for producing a sync output signal corresponding to the start of each of the horizontal scan lines of the laser beam, wherein each said sync output signal is employed to initiate said source of clock pulses for advancing the horizontal bit counter, the character counter, and the scan line counter in synchronism with the horizontal scanning movement of said laser beam.

19. The invention in accordance with claim 4 wherein said laser modulator is controlled by the output of said character generator circuit means to modulate said laser beam to print said row of graphic characters on said recording medium in the form of transparent characters on a dark background.

20. The invention in accordance with claim 4 wherein said laser modulator is controlled by the output of said character generator circuit means to modulate said laser beam to print said row of graphic characters on said recording medium in the form of dark characters on a transparent background.

* * * * *